(12) United States Patent
Thompson et al.

(10) Patent No.: US 10,627,984 B2
(45) Date of Patent: Apr. 21, 2020

(54) SYSTEMS, DEVICES, AND METHODS FOR DYNAMIC VIRTUAL DATA ANALYSIS

(71) Applicant: Walmart Apollo, LLC, Bentonville, AR (US)

(72) Inventors: John Paul Thompson, Bentonville, AR (US); Eric Anthony Letson, Bentonville, AR (US); Donald High, Noel, MO (US); Michael Dean Atchley, Springdale, AR (US); Robert C. Taylor, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 60 days.

(21) Appl. No.: 15/445,300

(22) Filed: Feb. 28, 2017

(65) Prior Publication Data

US 2017/0249073 A1     Aug. 31, 2017

Related U.S. Application Data

(60) Provisional application No. 62/301,146, filed on Feb. 29, 2016.

(51) Int. Cl.
*G06F 17/00* (2019.01)
*G06F 3/0481* (2013.01)
(Continued)

(52) U.S. Cl.
CPC ..... *G06F 3/04815* (2013.01); *G06Q 10/0639* (2013.01); *G06T 11/206* (2013.01); *G06T 19/20* (2013.01); *G06T 2200/24* (2013.01)

(58) Field of Classification Search
CPC .............. G06F 3/04815; G06T 11/206; G06T 2200/24
(Continued)

(56) References Cited

U.S. PATENT DOCUMENTS 8,745,086 B2 * 6/2014 Cardno .............. G06Q 30/0201
                                                        707/775
8,941,645 B2    1/2015 Grimaud
(Continued)

FOREIGN PATENT DOCUMENTS

WO          1995030201 A1    11/1995

*Primary Examiner* — Stephen S Hong
*Assistant Examiner* — Matthew J Ludwig
(74) *Attorney, Agent, or Firm* — McCarter & English, LLP; David R. Burns

(57) ABSTRACT

Methodologies, systems, and computer-readable media are provided for dynamic virtual data analysis. A first subset of performance metric data relating to a number of facilities is compared between at least two of the facilities to generate a first level comparison. A second subset of the performance metric data associated with two or more sections of at least one facility is compared to generate a second level comparison. A processor generates a graphical representation of the first level comparison and the second level comparison. A user electronic device can receive input from a user to dynamically navigate between a rendering of the graphical representation of the first level comparison and a rendering of the graphical representation of the second level comparison. The user can also modify the first subset of data or the second subset of data to update the first level comparison or the second level comparison.

21 Claims, 7 Drawing Sheets

(51) Int. Cl.
*G06T 11/20* (2006.01)
*G06T 19/20* (2011.01)
*G06Q 10/06* (2012.01)

(58) Field of Classification Search
USPC ...... 715/204, 243, 757, 790; 705/7.11, 7.29, 705/27.1, 27.2, 7.38, 14.24
See application file for complete search history.

(56) References Cited

U.S. PATENT DOCUMENTS

| | | | |
|---|---|---|---|
| 10,147,210 B1* | 12/2018 | Desai | G06T 11/60 |
| 2006/0277104 A1* | 12/2006 | Overhultz | G06Q 10/06375 |
| | | | 705/14.41 |
| 2008/0147475 A1 | 6/2008 | Gruttadauria | |
| 2008/0148189 A1* | 6/2008 | Szent-Miklosy | G06F 3/0481 |
| | | | 715/848 |
| 2008/0215462 A1* | 9/2008 | Sorensen | G06K 9/00771 |
| | | | 705/28 |
| 2009/0018996 A1* | 1/2009 | Hunt | G06F 16/283 |
| 2010/0228526 A1* | 9/2010 | Moore, III | G06Q 30/02 |
| | | | 703/1 |
| 2010/0325206 A1* | 12/2010 | Dayal | G06Q 10/10 |
| | | | 709/204 |
| 2012/0223943 A1 | 9/2012 | Williams et al. | |
| 2013/0300729 A1* | 11/2013 | Grimaud | G06T 7/001 |
| | | | 345/419 |
| 2013/0317950 A1 | 11/2013 | Abraham et al. | |
| 2014/0149158 A1* | 5/2014 | Odenheimer | G06Q 10/063 |
| | | | 705/7.11 |
| 2014/0365333 A1* | 12/2014 | Hurewitz | G06Q 30/0643 |
| | | | 705/26.9 |
| 2015/0161525 A1* | 6/2015 | Hirose | G06Q 10/02 |
| | | | 705/5 |
| 2015/0169190 A1* | 6/2015 | Girardeau | G06F 3/04842 |
| | | | 715/771 |
| 2015/0381946 A1* | 12/2015 | Renkis | G08B 13/19656 |
| | | | 348/47 |
| 2016/0162910 A1* | 6/2016 | Pradhan | G06Q 30/0201 |
| | | | 705/7.23 |
| 2017/0235853 A1* | 8/2017 | Griswold | G06F 17/5009 |
| | | | 703/1 |

* cited by examiner

SYSTEMS, DEVICES, AND METHODS FOR DYNAMIC VIRTUAL DATA ANALYSIS

CROSS-REFERENCE TO RELATED PATENT APPLICATIONS

This application claims priority to U.S. Provisional Application No. 62/301,146 filed on Feb. 29, 2016, the content of which is hereby incorporated by reference in its entirety.

BACKGROUND

Performance data relating to various facilities can be provided in spreadsheets or summarized using visual aids such as charts, graphs, or presentations. In many instances, a significant amount of time is required to review the spreadsheets, charts, graphs, and presentations summarizing the data.

SUMMARY

In accordance with embodiments of the present disclosure, a dynamic virtual data analysis system is disclosed. The system includes at least one processing unit programmed to retrieve performance metric data relating to a plurality of facilities from a database. The processing unit is also programmed to compare a first subset of data from the performance metric data between two or more of the plurality of facilities to generate a first level comparison. The processing unit is also programmed to compare a second subset of data from the performance metric data associated with two or more sections of at least one facility of the plurality of facilities to generate a second level comparison. The two or more sections include at least one of a department, an aisle, a modular unit, or a shelf of the at least one facility. The processing unit is also programmed to generate a graphical representation of the first level comparison and the second level comparison. The system also includes a user electronic device configured to dynamically transition between a rendering of a graphical representation of the first level comparison and rendering of a graphical representation of the second level comparison in response to a first user input. The processing unit is also configured to update the first level comparison, to update the second level comparison, or to update both the first level comparison and the second level comparison, in response to a second user input received at the user electronic device, the second user input modifying at least one of the first subset of data or the second subset of data.

Additional combinations or permutations of the above examples are envisioned as being within the scope of the present disclosure. It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

The foregoing and other features and advantages provided by the present disclosure will be more fully understood from the following description of exemplary embodiments when read together with the accompanying drawings, in which.

DETAILED DESCRIPTION

Figure 1:
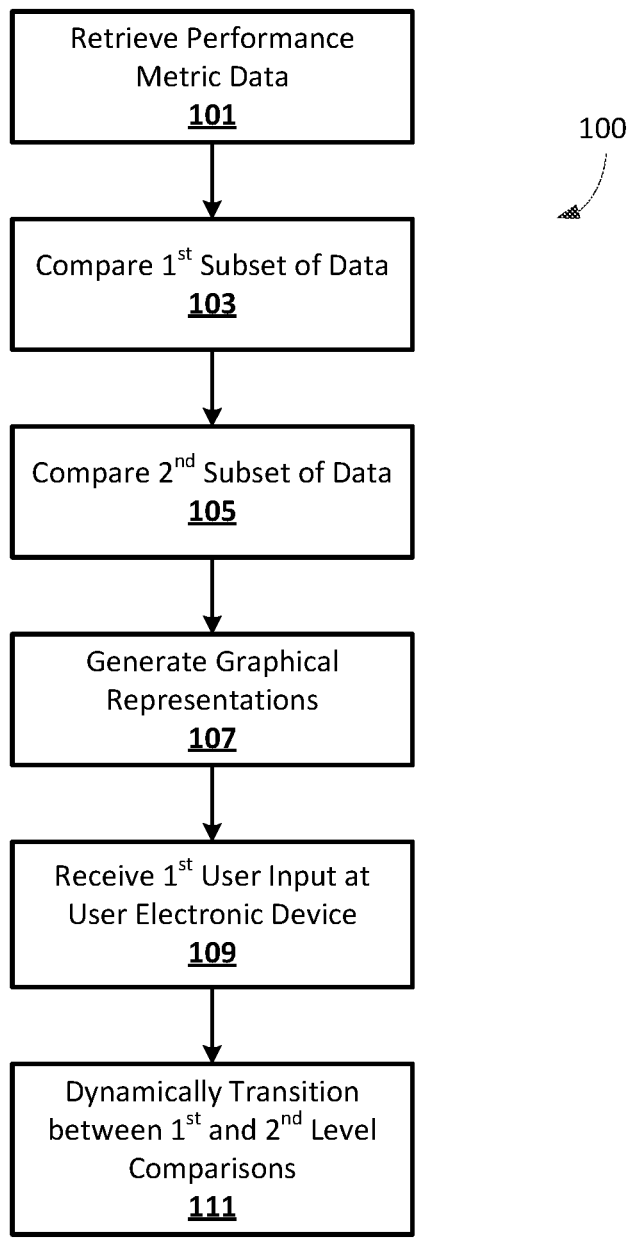
FIG. 1 is a flowchart illustrating an exemplary dynamic virtual data analysis method, according to embodiments of the present disclosure.

Following below are more detailed descriptions of various concepts related to, and embodiments of, inventive methods, apparatus, and systems for dynamic virtual data analysis. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

As used herein, the term "includes" means includes but is not limited to, the term "including" means including but not limited to. The term "based on" means based at least in part on.

Example methodologies, systems, apparatus, and non-transitory computer-readable media are described herein to facilitate rendering and navigating a dynamic virtual or augmented reality environment data analysis system.

The effort to analyze one or more facilities to understand and quantify their performance, and to compare their performance using metrics, can be a tedious and time-consuming process. To perform such analysis, one or more people visiting the facilities in question may receive a packet of information including data regarding the performance levels of the facilities, how the facility is tracking towards specified threshold performance and other goals, and how performance metrics in a given facility compares to that of other facilities. The packet is usually in the form of spreadsheets containing hundreds to thousands of data points. Significant amounts of time could be spent pouring over the packet of materials and picking out the relevant metrics of interest for various sections of the facility.

In accordance with some embodiments of the present disclosure, a dynamic virtual data analysis system is disclosed. The techniques disclosed herein allow a user to visualize the metrics characterizing the operation of a facility or group of facilities in a virtual reality environment, using metrics and analytics overlaid on virtual representations of a facility, a section within a facility, or an object within a facility. Numerous data points can be converted into easily understood visual analytics that are overlaid on a geographic map and a digital representation of facilities at various levels of detail (e.g. from a national or global level down to a product level representation). Different sets of visual analytics can change at different levels of detail in order to provide a tailored visualization of performance metrics. For example, while viewing a graphical representation of a comparison between two facilities, an individual can view the overall sales numbers associated with those facilities. However, upon entering the graphical representation of one of the facilities, the dynamic virtual data analysis system allows an individual to view analytics for various departments or objects within the facility. Using the dynamic virtual data analysis system, a user can compare facilities, sections of facilities, or objects within facilities virtually and determine how to view the comparison. For example, the user can compare different departments within a single facility, different facilities within a single area, or manually enter facility identification numbers to select the facilities for the comparison.

In exemplary embodiments, the user can interact with the user electronic device implementing the dynamic virtual data analysis system to dynamically navigate between different levels of detail, or zoom in and out within the dynamic virtual data analysis system. The user electronic device can be, for example, a head mounted display, smart phone, tablet, ultrabook, netbook, laptop, Internet appliance, handheld device, wireless device, portable device, wearable computer, cellular or mobile phone, portable digital assistant (PDAs), game console, smart glasses, etc. In exemplary embodiments, a distinct user electronic device can be used for viewing different aspects of the dynamic virtual data analysis system. For example, if a user wishes to view performance metrics in connection with an operations view, in connection with an executive view, or in connection with a manager view, the user could select a user electronic device configured as an operations user electronic device, an executive user electronic device, or a manager user electronic device. That is, each user electronic device could be configured to perform differing types of analysis and render differing graphical representations depending on the differing operations view. Additional tools may also be available on the user electronic device. For example, a predictive tool could allow a user to implement various "what if" tests within the virtual environment.

Upon using the dynamic virtual data analysis system to zoom in closer on a visualization of a facility, a section within a facility, or an object within a facility, more metrics or different metrics can be provided for view and analysis. That is, with each differing level of visualization of the facility or section of the facility, the dynamic virtual data analysis system can be configured to present an updated set of analytics to the user based on the section being viewed. For example, from a distance, metrics for performance in connection with a specific aisle within a facility can be shown. As the user uses the dynamic virtual data analysis system to navigate from an overall view of the aisle to a view of a specific modular unit within the aisle, the performance metrics in connection with individual modular units can be displayed. Similarly, if the user uses the dynamic virtual data analysis system to navigate closer toward a portion of the modular unit, the performance metric in connection with individual shelves or products can be displayed. In exemplary embodiments, the dynamic virtual data analysis system can include a filter function to allow a user to select which metrics are of interest. The hover-over functions of a mouse or switching a device, from portrait to landscape orientation, could be used to cause the dynamic virtual data analysis system to display different perspectives of the facility or section of the facility. The graphical representation can also include an icon, visible at any level of detail, that can be selected to activate or deactivate a comparison mode.

Various performance metrics may be analyzed using an example dynamic virtual data analysis system herein. Non-limiting examples of performance metrics include, for example, data values quantifying shrinkage, facility maintenance, degree of compliance with government or facility regulations or policies, annual inventory, performance compared to competitors, customer or user traffic, energy efficiency, sales, profits, wages, expenses, market share, measures of customer satisfaction, associate engagement, product availability, sales increase, etc. The performance metrics can also include data relating to local economic factors, community engagement, competitors entering or leaving the area, total number of competitors, competitor proximity to facilities, level of competition (e.g. how many departments a competitor has that directly competes with facility departments), etc.

In one embodiment, a user can conduct a general tour of various facilities and can select specific facilities and the order in which they are to be reviewed or virtually inspected. The user can, for example, tour the top or bottom 10% or 15% of facilities based on various metrics such as customer satisfaction, associate engagement, sales, profits, shrinkage, etc. In other embodiments, the choice of facilities can be made based on building format, climate zones, demographic similarities, similar traits (e.g. college towns, professional sports teams, etc.), In exemplary embodiments, the user can follow a particular facility manager and view performance metrics related to facilities or departments assigned to the particular manager. The user can also use the dynamic virtual data analysis system to rank facilities, sections within a facility, etc. based on the one or more of the metrics described above In exemplary embodiments of the dynamic virtual data analysis system, the user can choose that the graphical representation illustrate any changes in performance metrics since the last facility visit or the last virtual facility visit. In other embodiments of the dynamic virtual data analysis system, the user can choose a date range, or choose to view changes since a particular event, such as a visit with a particular facility manager, a particular communication or phone call, or a particular meeting or training event.

In exemplary embodiments of the dynamic virtual data analysis system, the graphical representation of the first level comparison or the graphical representation of the second level comparison can include visualizations of the various performance metrics relating to facilities, sections within a facility, or products. The graphical representations can include, for example, product icons, numbers, gauges, bar graphs, pie charts, lines, points, heat maps, Harvey balls, arrows, emoticons, colors, gradient coloration of icons, completeness of icons, size of icons, etc. The graphical representations can also include, for example, a modification of a virtual representation of a physical object (e.g. changing the color, size, or shape, of an object or section within the facility based on a metric). In exemplary embodiments of the dynamic virtual data analysis system, the graphical representations could be represented as floating graphs in particular areas of a virtual representation of a facility or superimposed over a particular area. The graphical representations can also include avatars, or a representation of a facility or section of a facility having a different size or color to indicate areas of interest. The graphical representation of a facility or a section within a facility could be morphed to represent numbers. The graphical representations and sets of data used to generate the graphical representations described herein can change based on the type of review (e.g. whether the user is interested in reviewing profit growth vs. energy efficiency) or the level of granularity of the review. For example, performance metric data for a specific object within an aisle in a facility may not be relevant to a comparison at a high level between two facilities.

In exemplary embodiments, a user may be able to interact with the dynamic virtual data analysis system in order to dynamically navigate between different levels of comparison. For example, if a user wishes to compare two or more facilities against each other, a graphical representation of the facilities in question can be generated and rendered, allowing the user to compare performance metrics between the facilities. If a user wishes to drill down to a lower level of comparison and compare, for example, two departments within one facility, the user can interact with the user electronic device in order to dynamically navigate from a high level comparison between facilities to a lower level comparison between sections within one or more facility.

In exemplary embodiments, a user may be able to interact with the dynamic virtual data analysis system in order to add a virtual marker or flag at various levels of the graphical representation. In one such embodiment, the user can add a virtual marker to the graphical representation of the first level comparison or the graphical representation of the second level comparison using an input command received at the user electronic device. The virtual marker can be used to flag a facility, section of a facility, or a virtual representation of an object within a facility for later identification and review. Marked items or metrics can be added to a list to be used during a site visit or for further analysis, or data related to marked items can be pushed to a computing device for future reference. Marked items can also be assigned a priority and ordered accordingly, in exemplary embodiments. In some embodiments, a text, audio, or visual annotation can be associated in a feedback loop with various metrics, facilities, sections of facilities, or objects within a facility to create an interactive experience for the user. Similar to a videogame environment, the virtual model of a store may also include individuals within the store with whom the user can interact. For example, the user may approach a department manager character and enquire about sales, or approach a customer and enquire about their shopping preferences. Additionally, the virtual model can include various role representatives, such as a cashier or a stocker, and those associates' performance statistics could be seen, or a particular individual's status report, or resume could be viewed, etc.

Interactions with the user electronic device can include input received via a keyboard, mouse, gamepad controller, touch sensitive surface, etc. User input can also include voice commands or non-touch gestures recognizable by the user electronic device. In exemplary embodiments, combinations of user inputs allow the user to navigate through a single level comparison or dynamically navigate between different levels of comparisons. Dynamically navigating between various levels of comparison provides a fluid visual experience for the user. For example, navigating from a facility level comparison to view a comparison of different sections within a facility can provide the user with a visualization of approaching a virtual model of a facility and passing through an entrance to view virtual models of various sections within the facility.

In exemplary embodiments, the user can change the metrics of interest, the sets of data being compared, or the level of detail at any point during the virtual inspection. Each change may involve additional aspects that can be modified, in some embodiments. For example, when changing from a numbers comparison to a ranking, the user can choose an operational level to rank the metrics by.

Exemplary embodiments are described below with reference to the drawings. One of ordinary skill in the art will recognize that exemplary embodiments are not limited to the illustrative embodiments, and that components of exemplary systems, devices and methods are not limited to the illustrative embodiments described below.

FIG. 1 is a flowchart illustrating an exemplary dynamic virtual data analysis method 100, according to embodiments of the present disclosure. It will be appreciated that the method is programmatically performed by one or more computer-executable processes executing on, or in communication with the server or servers described further below. In step 101, an analytics engine retrieves from a database performance metric data relating to a number of facilities.

In step 103, a data comparison module compares a first subset of data from the performance metric data between two or more of the facilities in order to generate a first level comparison. As discussed above, the virtual data analysis system described herein can compare performance metrics at various levels of detail. In this embodiment, the first level comparison includes a comparison between two or more facilities. The first subset of data includes data relevant to a comparison between two facilities, as well as any desired data subsets indicated by the user. For example, if the user wishes to compare the energy efficiency or the overall profits between two facilities, the first subset of data includes a portion of the performance metric data relating to energy efficiency or overall profits. In some embodiments, the first subset of data and the second subset of data include data relating to profits, shrinkage, sales, market share, expenses, customer satisfaction, associate engagement, community engagement, local economic data, facility maintenance, associate compliance, energy efficiency, or customer traffic.

In step 105, a data comparison module compares a second subset of data from the performance metric data associated with two or more sections of at least one of the facilities in order to generate a second level comparison. The sections of the facility can include, for example, a department, an aisle, a modular unit, or a shelf within the facility. In some embodiments, the data comparison module compares a third subset of data from the performance metric data between two or more individual objects within at least one of the facilities in order to generate a third level comparison.

In step 107, a graphical representation module generates a graphical representation of the first level comparison and a graphical representation of the second level comparison. In exemplary embodiments, the graphical representation of the first level comparison and the graphical representation of the second level comparison include at least one of: a number, gauge, bar graph, pie chart, color pattern, heat map, Harvey ball, arrow, emoticon, or coloration gradient. The graphical representations of the first level comparison and the second level comparison can vary depending on the intent of the user. In exemplary embodiments, a user may wish for an analysis of values indicating positive performance about one or more facilities or sections of a facility. In such cases, the graphical representation can illustrate what areas or metrics the one or more facilities or sections of a facility are improving on. Similarly, if a user wishes for an analysis of values indicating negative performance about a facility, the graphical representation can illustrate only areas in which the facility is performing poorly.

In step 109, a first user input is received at a user electronic device. The user electronic device can include, for example, a mobile phone, portable digital assistant, laptop computer, or a wireless portable device. In exemplary embodiments, the graphical representation of the second level comparison is overlaid on an image of the a facility department, aisle, modular unit, or shelf. In alternative embodiments, the user electronic device is a head-mounted display, and the graphical representation of the first level comparison includes a virtual model of two or more of the facilities.

In step 111, the graphical representation module dynamically transitions between a rendering of a graphical representation of the first level comparison and a rendering of a graphical representation of the second level comparison. In exemplary embodiments, the user electronic device is configured to perform the dynamic transitioning by rendering an updated graphical representation including updated computations of comparisons in response to user input that modifies a visualization of the facility from an overhead view to a view of the two or more sections of the facility.

Figure 2:
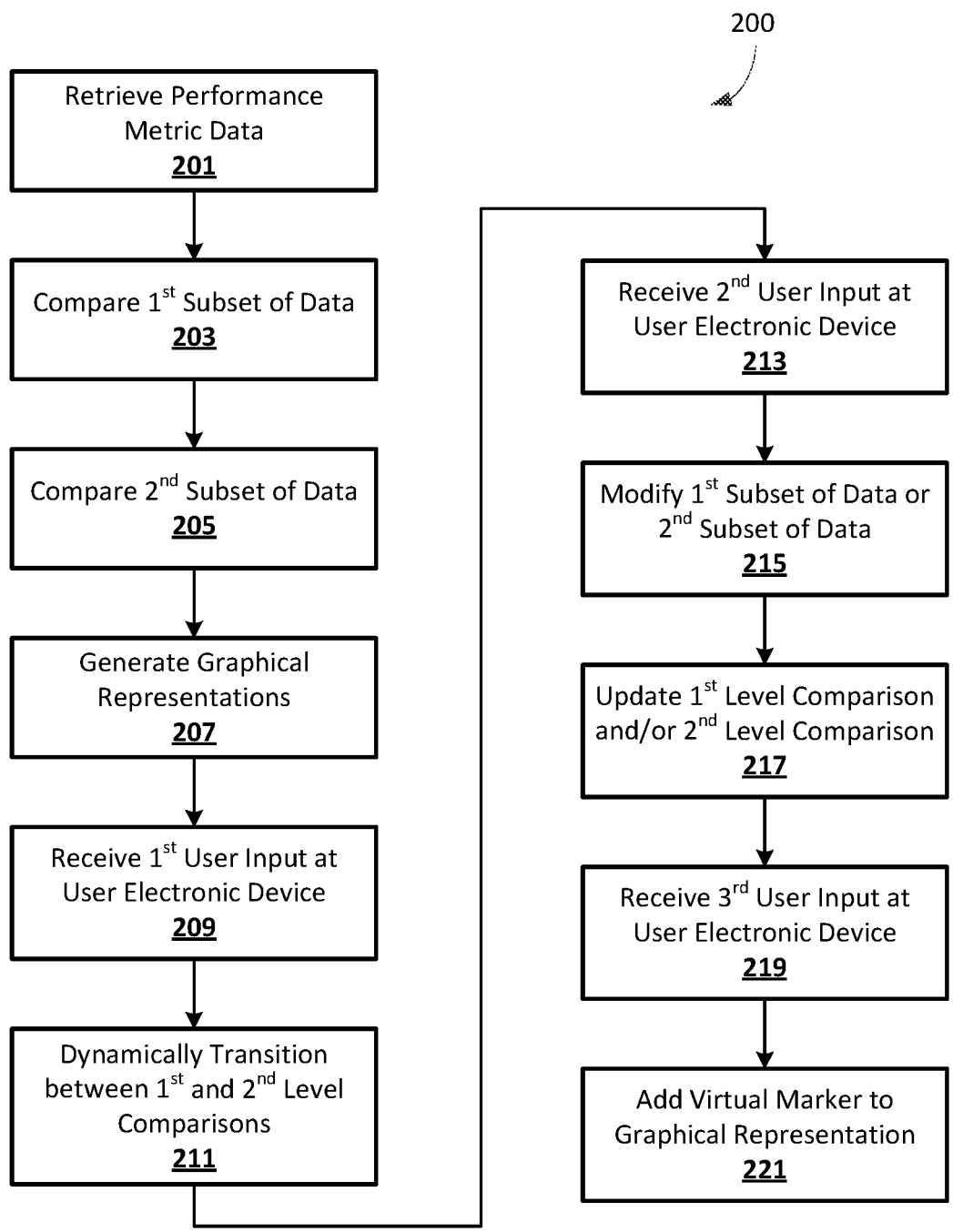
FIG. 2 is a flowchart illustrating another exemplary dynamic virtual data analysis method, according to embodiments of the present disclosure.

FIG. 2 is a flowchart illustrating another exemplary dynamic virtual data analysis method 200, according to embodiments of the present disclosure. It will be appreciated that the method is programmatically performed by one or more computer-executable processes executing on, or in communication with the server or servers described further below. In step 201, an analytics engine retrieves from a database performance metric data relating to a number of facilities.

In step 203, a data comparison module compares a first subset of data from the performance metric data between two or more of the facilities in order to generate a first level comparison. As discussed above, the virtual data analysis system described herein can compare performance metrics at various levels of detail. In this embodiment, the first level comparison includes a comparison between two or more facilities. The first subset of data includes data relevant to a comparison between two facilities, as well as any desired data subsets indicated by the user. For example, if the user wishes to compare metrics for the energy efficiency or the overall profits between two facilities, the first subset of data includes a portion of the performance metric data relating to energy efficiency or overall profits. In some embodiments, the first subset of data and the second subset of data include data relating to profits, shrinkage, sales, market share, expenses, customer satisfaction, associate engagement, community engagement, local economic data, facility maintenance, associate compliance, energy efficiency, or customer traffic.

In step 205, a data comparison module compares a second subset of data from the performance metric data associated with two or more sections of at least one of the facilities in order to generate a second level comparison. The sections of the facility can include, for example, a department, an aisle, a modular unit, or a shelf within the facility. In some embodiments, the data comparison module compares a third subset of data from the performance metric data between two or more individual objects within at least one of the facilities in order to generate a third level comparison.

In step 207, a graphical representation module generates a graphical representation of the first level comparison and a graphical representation of the second level comparison. In exemplary embodiments, the graphical representation of the first level comparison and the graphical representation of the second level comparison include at least one of: a number, gauge, bar graph, pie chart, color pattern, heat map, Harvey ball, arrow, emoticon, or coloration gradient. The graphical representations of the first level comparison and the second level comparison can vary depending on the intent of the user. In exemplary embodiments, a user may wish for an analysis of values indicating positive performance about one or more facilities or sections of a facility. In such cases, the graphical representation can illustrate what areas or metrics the one or more facilities or sections of a facility are improving on. Similarly, if a user wishes for an analysis of values indicating negative performance about a facility, the graphical representation can illustrate only areas in which the facility is performing poorly.

In step 209, a first user input is received at a user electronic device. The user electronic device can include, for example, a mobile phone, portable digital assistant, laptop computer, or a wireless portable device. In exemplary embodiments, the graphical representation of the second level comparison is overlaid on an image of the facility department, aisle, modular unit, or shelf. In alternative embodiments, the user electronic device is a head-mounted display, and the graphical representation of the first level comparison includes a virtual model of two or more of the facilities.

In step 211, the graphical representation module dynamically transitions between a rendering of a graphical representation of the first level comparison and a rendering of a graphical representation of the second level comparison. In exemplary embodiments, the user electronic device is configured to perform the dynamic transitioning by rendering an updated graphical representation including updated computations of comparisons in response to user input that modifies a visualization of the facility from an overhead view to a view of the two or more sections of the facility.

In step 213, a second user input is received at the user electronic device to modify the first subset of data or the second subset of data. In step 215, the first subset of data or the second subset of data is modified in response to the second user input received in step 213. In step 217, the graphical representation module updates the first level comparison, updates the second level comparison, or updates both the first level comparison and the second level comparison, in response to the second user input received in step 213.

In step 219, a third user input is received at the user electronic device. In step 221, the graphical representation module adds a virtual marker to the graphical representation of the first level comparison or the graphical representation of the second level comparison. The virtual marker can be used to flag a facility, section of a facility, or a virtual representation of an object within a facility for future reference, as discussed above.

Figure 3:
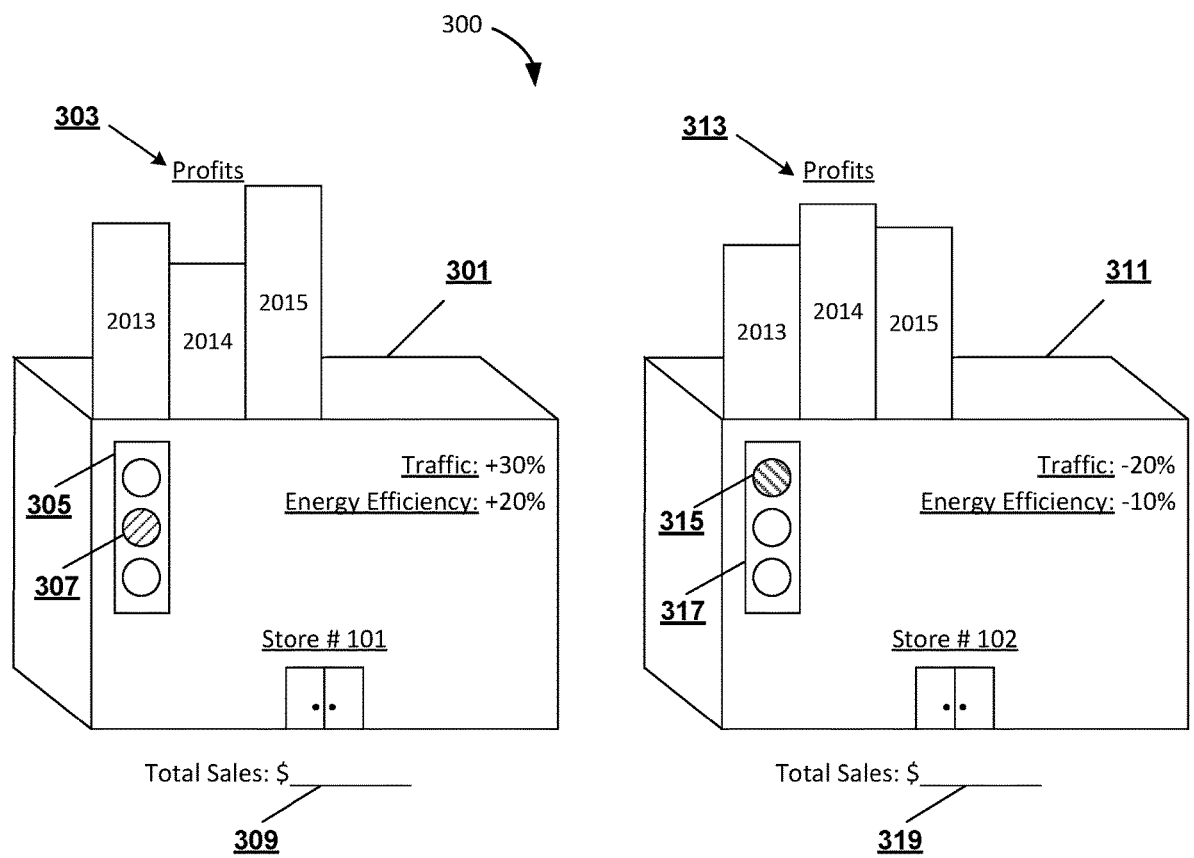
FIG. 3 illustrates a graphical representation of a comparison between two facilities, according to embodiments of the present disclosure.

FIG. 3 is a graphical representation 300 of a comparison between two facilities, according to embodiments of the present disclosure. In this example embodiment, a virtual three dimensional model or graphical representation of a facility 301 is labeled with a facility number and is presented along with a number of analytics. Specifically, the graphical representation includes a bar graph 303 showing profits for three years, and an indication of the total sales 309 generated by that facility. The graphical representation also includes an indication of the percent change in traffic and energy efficiency over the past year, and a color-coded indicator 305, like a traffic light, showing the current status of the facility. In this embodiment, a yellow light 307 is illuminated indicating that the facility is performing moderately well overall.

A second virtual three dimensional graphical representation of a facility 311 is rendered and labeled with a facility number. The graphical representation includes a bar graph 313 showing profits for the past three years, as well as an indication of the percent change in traffic and energy efficiency over the past year. The graphical representation also includes an indication of the total sales 319 generated by that facility. The graphical representation also includes a color-coded indicator 317, like a traffic light, showing the current status of the facility. In this embodiment, the traffic, energy efficiency, and profits are down compared to the previous year, so a red light 315 is illuminated indicating that this facility is performing poorly.

Figure 4:
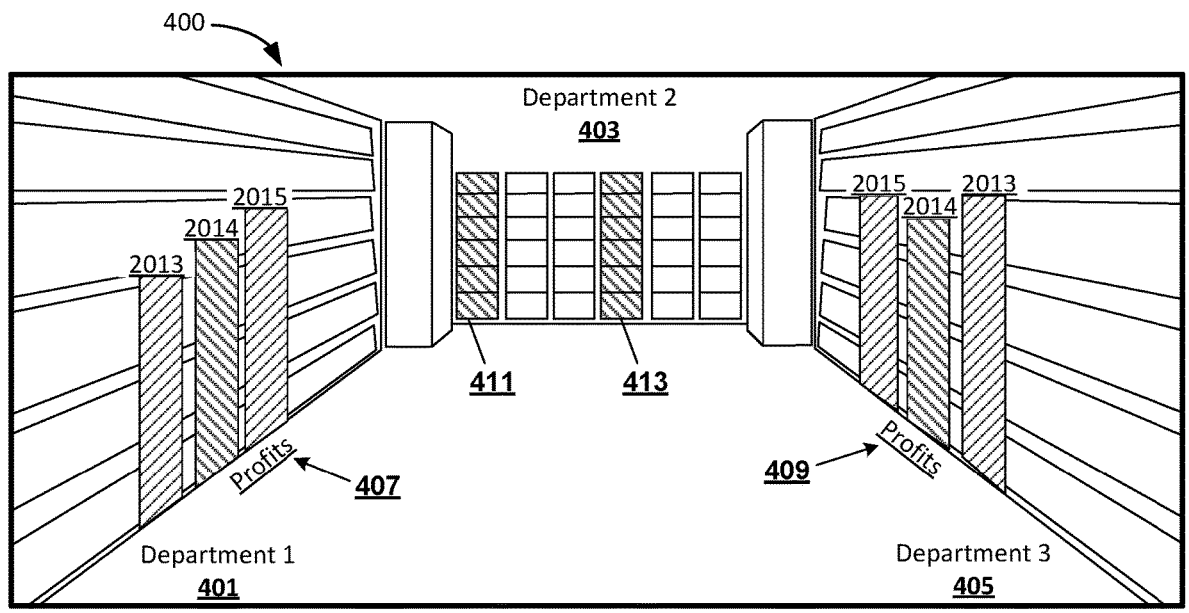
FIG. 4 illustrates a graphical representation of a comparison between sections within a facility, according to embodiments of the present disclosure.

FIG. 4 is a graphical representation of a comparison 400 between sections within a facility, according to embodiments of the present disclosure. In this example embodiment, three different departments 401, 403, and 405 are visible within a facility. In the first department 401, a bar graph 407 is superimposed over an aisle showing a graphical representation of the profits for that aisle for three different years. Similarly, in the third department 405, a bar graph 409 is superimposed over an aisle showing a graphical representation of the profits for that aisle for three different years. As discussed above, the graphical representations can include various types of visualizations. In this embodiment, the second department 403 does not show a bar graph, but rather has shaded shelving units 411 and 413 to indicate that they are areas with lower performance metrics. For example, the shelving units 411 and 413 contain products that have not been selling well, and they can be shaded red or orange colored, depending on how poorly the products on those shelves have been performing.

Figure 5:
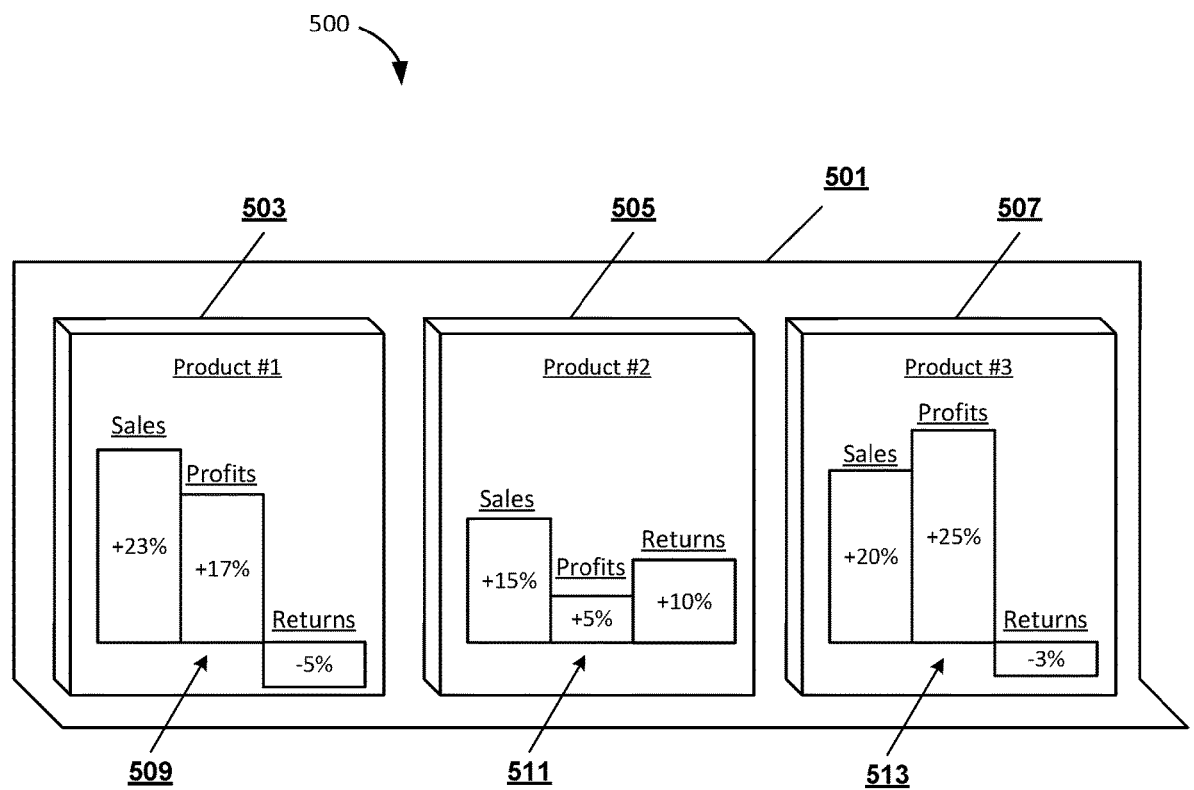
FIG. 5 illustrates a graphical representation of a comparison between objects within a facility, according to embodiments of the present disclosure.

FIG. 5 is a graphical representation of a comparison 500 between objects within a facility, according to embodiments of the present disclosure. In this example embodiment, a shelf 501 can be seen holding a first product 503, a second product 505, and a third product 507. The first product 503 is shown with a bar graph 509 depicting graphically how that particular product has performed in the past year according to three particular metrics. In this example embodiment, the bar graph 509 illustrates that sales of the first product have increased 23%, profits from the first product have increased 17%, and returns for the first product have decreased 5%. Similarly, the second product 505 is shown with a bar graph 511 depicting graphically how that product has performed in the past year with respect to the same three metrics. In this example embodiment, the bar graph 511 illustrates that sales of the second product have increased 15%, profits from the second product have increased 5%, and returns for the second product have increased 10%. Finally, the third product 507 is shown with a bar graph 513 depicting graphically how that product has performed in the past year with respect to the same three metrics. In this example embodiment, the bar graph 513 illustrates that sales of the third product have increased 20%, profits from the third product have increased 25%, and returns for the third product have decreased 3%. As will be appreciated, the examples provided herein are for illustrative purposes only, and different products or metrics can result in different analytics and different graphical representations.

Figure 6:
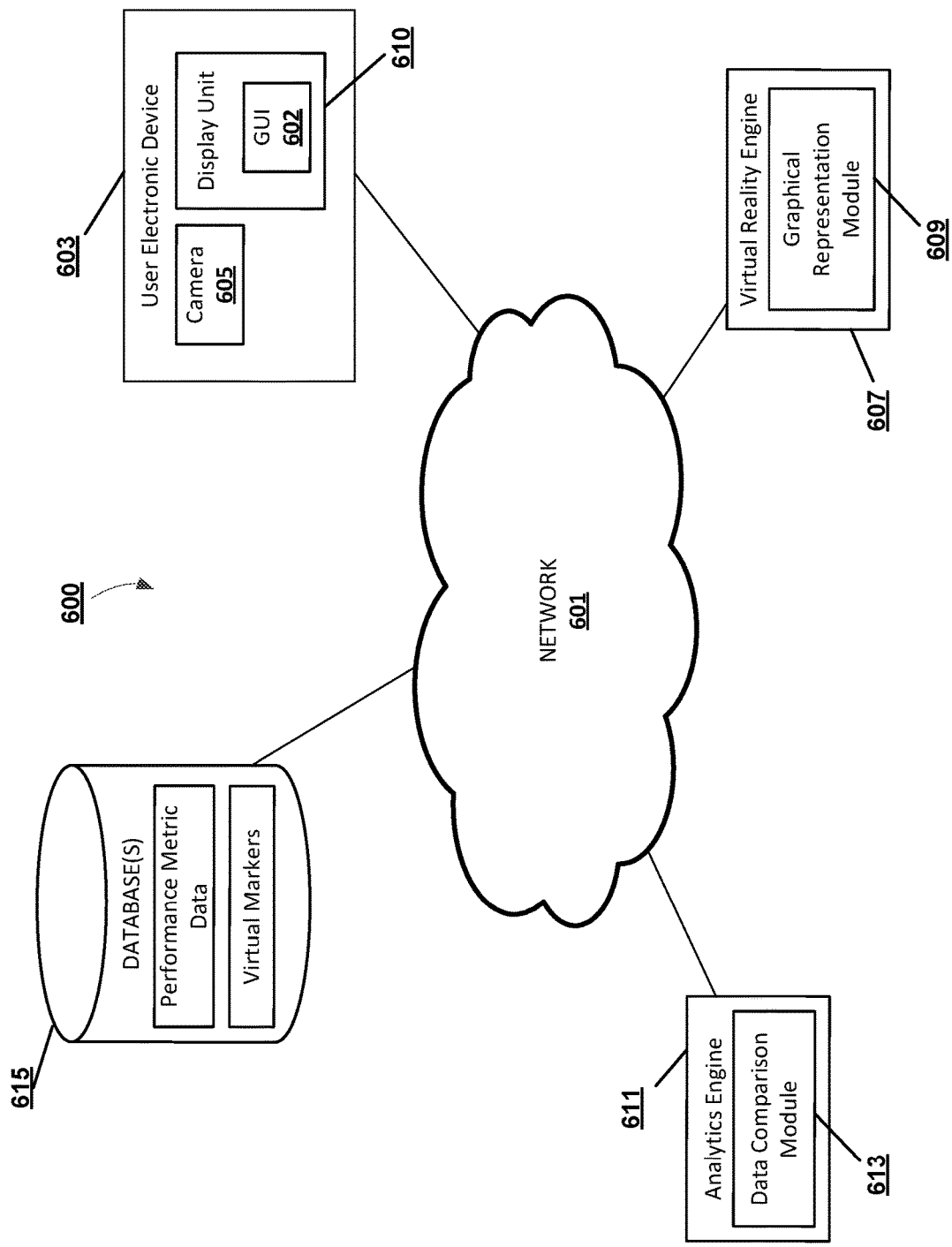
FIG. 6 is a diagram of an exemplary network environment suitable for a distributed implementation of an exemplary embodiment of the present disclosure.

FIG. 6 illustrates a network diagram depicting a system 600 suitable for a distributed implementation of exemplary embodiments. The system 600 can include a network 601, a user electronic device 603, a virtual reality engine 607, an analytics engine 611, and a database 615. As will be appreciated, the virtual reality engine 607 and analytics engine 611 can be local or remote servers, and various distributed or centralized configurations may be implemented, and in some embodiments a single server can be used. In exemplary embodiments, virtual reality engine 607 and the analytics engine 611 can include one or more modules 609 and 613, which can implement one or more of the processes described herein, or portions thereof, with reference to FIGS. 1-2. For example, the virtual reality engine 607 can include a graphical representation module 609 configured to generate a digital three dimensional representation of two or more facilities, as well as a digital three dimensional representation of sections within the facilities. The graphical representation module 609 also generates a graphical representation of metrics related to the facilities or the sections within the facilities. The graphical representations can illustrate information relating to the performance metrics discussed above or operations happening within one or more facility. The analytics engine 611 can include a data comparison module 613 configured to compare the first and second subsets of data and to create data comparisons or analytics to be incorporated into the graphical representations generated by the graphical representation module 609. The user electronic device 603, virtual reality engine 607, and analytics engine 611 can communicate with each other and with the database 615 to transmit and receive messages, perform database queries, and implement the processes described above.

In exemplary embodiments, the user electronic device 603 may include a display unit 610, which can display a GUI 602 to a user of the device 603 such that the user can view the graphical representations and dynamic virtual environment, as described above. In some embodiments, the user electronic device 603 also includes a camera 605 for capturing video footage over which the graphical representations can be overlaid. The user electronic device 603 may include, but is not limited to, head mounted displays, smart phones, tablets, ultrabooks, netbooks, laptops, computers, general purpose computers, Internet appliances, hand-held devices, wireless devices, portable devices, wearable computers, cellular or mobile phones, portable digital assistants (PDAs), desktops, multi-processor systems, microprocessor-based or programmable consumer electronics, game consoles, set-top boxes, network PCs, mini-computers, smartphones, tablets, netbooks, and the like. The user electronic device 603 may include some or all components described in relation to computing device 700 shown in FIG. 7. The user electronic device 603 may connect to network 601 via a wired or wireless connection. The user electronic device 603 may include one or more applications such as, but not limited to, a web browser, a sales transaction application, an object reader application, and the like.

In exemplary embodiments, the user electronic device 603 can include a head mounted display that a user can wear to view a virtual (aka computer generated) world. The virtual world can include, for example, three dimensional models or graphical representations of the facilities and sections of facilities discussed above, and a user can navigate through the facilities to perform a virtual tour of various sections within a facility. In exemplary embodiments, the user can interact with the user electronic device 603 using a keyboard, mouse, gamepad controller, voice commands, or non-touch gestures recognizable by the user electronic device. In alternative embodiments, the user electronic device 603 can be a mobile device, such as a smartphone, tablet, or smart glasses that can provide augmented reality directly through an on-board camera 605.

In exemplary embodiments, the user electronic device 603, virtual reality engine 607, analytics engine 611, and database 615 may be in communication with each other via a communication network 601. The communication network 601 may include, but is not limited to, the Internet, an intranet, a LAN (Local Area Network), a WAN (Wide Area Network), a MAN (Metropolitan Area Network), a wireless network, an optical network, and the like. In one embodiment, the user electronic device 603, virtual reality engine 607, and analytics engine 611 can transmit instructions to each other over the communication network 601. In exemplary embodiments, the performance metric data, virtual markers, and other data can be stored at database 615 and received at the analytics engine 611.

Figure 7:
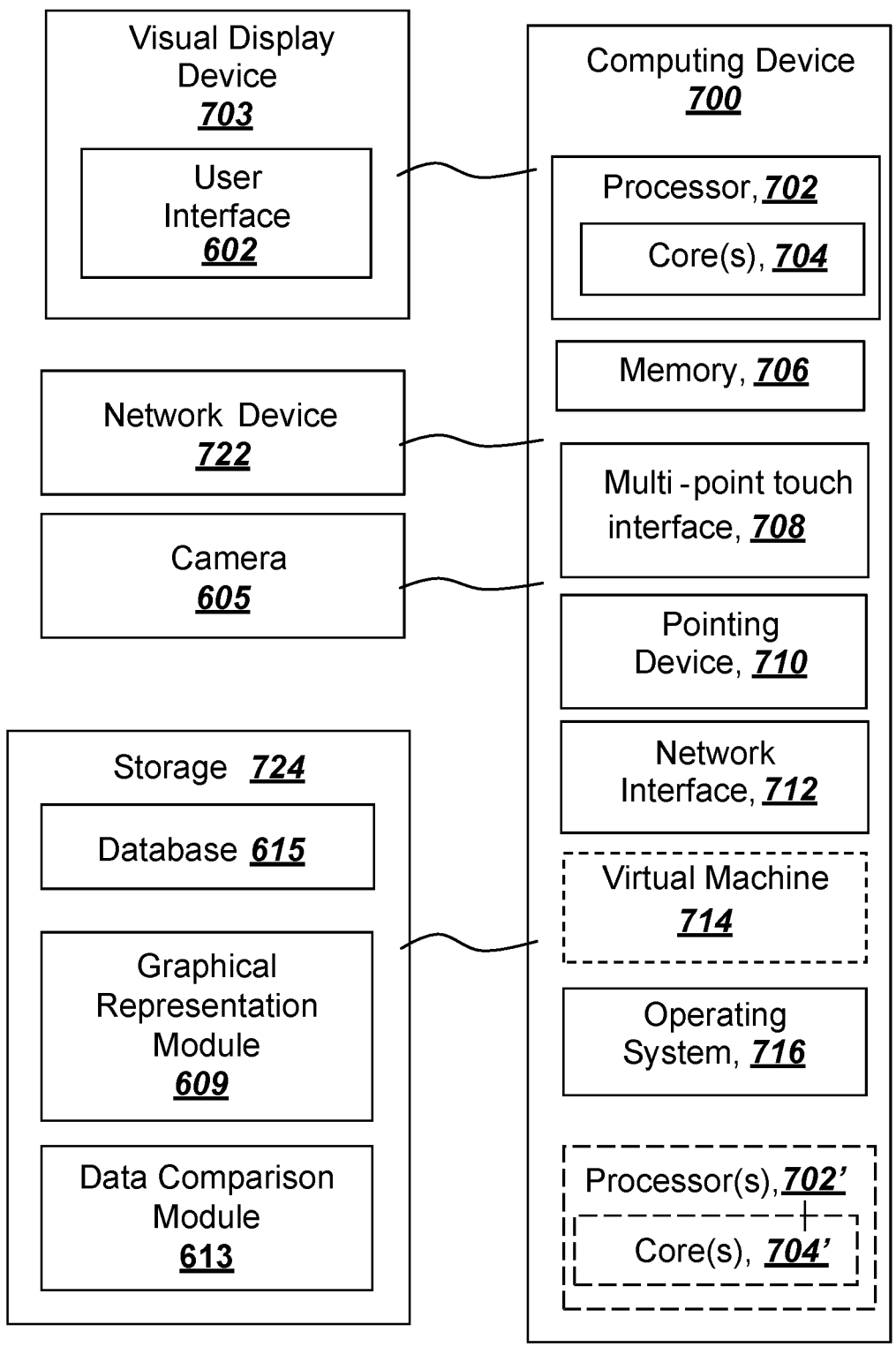
FIG. 7 is a block diagram of an exemplary computing device that can be used to perform exemplary processes in accordance with an exemplary embodiment of the present disclosure.

FIG. 7 is a block diagram of an exemplary computing device 700 that can be used in the performance of any of the example methods according to the principles described herein. The computing device 700 includes one or more non-transitory computer-readable media for storing one or more computer-executable instructions (such as but not limited to software or firmware) for implementing any example method according to the principles described herein. The non-transitory computer-readable media can include, but are not limited to, one or more types of hardware memory, non-transitory tangible media (for example, one or more magnetic storage disks, one or more optical disks, one or more USB flashdrives), and the like.

For example, memory 706 included in the computing device 700 can store computer-readable and computer-executable instructions or software for implementing exemplary embodiments and programmed to perform processes described above in reference to FIGS. 1-2. The computing device 700 also includes processor 702 and associated core 704, and optionally, one or more additional processor(s) 702' and associated core(s) 704' (for example, in the case of computer systems having multiple processors/cores), for executing computer-readable and computer-executable instructions or software stored in the memory 706 and other programs for controlling system hardware. Processor 702 and processor(s) 702' can each be a single core processor or multiple core (704 and 704') processor.

Virtualization can be employed in the computing device 700 so that infrastructure and resources in the computing device can be shared dynamically. A virtual machine 714 can be provided to handle a process running on multiple processors so that the process appears to be using only one computing resource rather than multiple computing resources. Multiple virtual machines can also be used with one processor.

Memory 706 can be non-transitory computer-readable media including a computer system memory or random access memory, such as DRAM, SRAM, EDO RAM, and the like. Memory 706 can include other types of memory as well, or combinations thereof.

A user can interact with the computing device 700 through a visual display device 703, such as a touch screen display or computer monitor, which can display one or more user interfaces 602 that can be provided in accordance with exemplary embodiments. The computing device 700 can include or be in communication with a camera 605 for capturing video footage over which the graphical representations can be overlaid. The computing device 700 can also include other I/O devices for receiving input from a user, for example, a keyboard or any suitable multi-point touch interface 708, a pointing device 710 (e.g., a pen, stylus, mouse, or trackpad). The keyboard 708 and the pointing device 710 can be coupled to the visual display device 703. The computing device 700 can include other suitable conventional I/O peripherals.

The computing device 700 can also include one or more storage devices 724, such as a hard-drive, CD-ROM, or other non-transitory computer readable media, for storing data and computer-readable instructions and/or software, such as a graphical representation module 609 and a data comparison module 613 that can implement exemplary embodiments of the methods and systems as taught herein, or portions thereof. Exemplary storage device 724 can also store one or more databases 615 for storing any suitable information required to implement exemplary embodiments. The databases can be updated by a user or automatically at any suitable time to add, delete, or update one or more items in the databases. Exemplary storage device 724 can store one or more databases 615 for storing performance metric data, virtual markers, and any other data/information used to implement exemplary embodiments of the systems and methods described herein.

The computing device 700 can include a network interface 712 configured to interface via one or more network devices 722 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 712 can include a built-in network adapter, network interface card, PCMCIA network card, card bus network adapter, wireless network adapter, USB network adapter, modem or any other device suitable for interfacing the computing device 700 to any type of network capable of communication and performing the operations described herein. Moreover, the computing device 700 can be any computer system, such as a workstation, desktop computer, server, laptop, handheld computer, tablet computer (e.g., the iPad® tablet computer), mobile computing or communication device (e.g., the iPhone® communication device), or other form of computing or telecommunications device that is capable of communication and that has sufficient processor power and memory capacity to perform the operations described herein.

The computing device 700 can run any operating system 716, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. In exemplary embodiments, the operating system 716 can be run in native mode or emulated mode. In an exemplary embodiment, the operating system 716 can be run on one or more cloud machine instances.

In describing example embodiments, specific terminology is used for the sake of clarity. For purposes of description, each specific term is intended to at least include all technical and functional equivalents that operate in a similar manner to accomplish a similar purpose. Additionally, in some instances where a particular example embodiment includes a plurality of system elements, device components or method steps, those elements, components or steps can be replaced with a single element, component or step. Likewise, a single element, component or step can be replaced with a plurality of elements, components or steps that serve the same purpose. Moreover, while example embodiments have been shown and described with references to particular embodiments thereof, those of ordinary skill in the art will understand that various substitutions and alterations in form and detail can be made therein without departing from the scope of the disclosure. Further still, other aspects, functions and advantages are also within the scope of the disclosure.

Example flowcharts are provided herein for illustrative purposes and are non-limiting examples of methods. One of ordinary skill in the art will recognize that example methods can include more or fewer steps than those illustrated in the example flowcharts, and that the steps in the example flowcharts can be performed in a different order than the order shown in the illustrative flowcharts.

What is claimed is:

1. A system for generating digital three dimensional graphical representations for dynamic virtual data analysis in a virtual reality environment comprising:
at least one processing unit programmed to:
retrieve performance metric data relating to a plurality of facilities from a database;
compare a first subset of data from the performance metric data between two or more of the plurality of facilities to generate a first level comparison;
compare a second subset of data from the performance metric data associated with two or more sections of a facility of the plurality of facilities to generate a second level comparison between the two or more sections, the two or more sections comprising at least one of a department, an aisle, a modular unit, or a shelf of the facility;
generate a digital three dimensional graphical representation of the first level comparison for the virtual reality environment that includes a virtual model of the two or more of the plurality of facilities;
generate a digital three dimensional graphical representation of the second level comparison for the virtual reality environment that is overlaid on an image of the department, the aisle, the modular unit, or the shelf of the facility, wherein the digital three dimensional graphical representation of the second level comparison displays a difference between the two or more sections; and
a user electronic device configured to provide a virtual reality environment, and:
in response to a first user input, dynamically transition between a rendering of a digital three dimensional graphical representation of the first level comparison in the virtual reality environment and rendering of a digital three dimensional graphical representation of the second level comparison in the virtual reality environment;
wherein the processing unit is further configured to update the first level comparison, or to update the second level comparison, or both the first level comparison and the second level comparison, in response to a second user input received at the user electronic device, the second user input modifying at least one of the first subset of data or the second subset of data.

2. The system of claim 1, wherein the first subset of data and the second subset of data include data relating to at least one of: profits, shrinkage, sales, market share, expenses, customer satisfaction, associate engagement, community engagement, local economic data, facility maintenance, associate compliance, energy efficiency, or customer traffic.

3. The system of claim 1, wherein the processing unit is further programmed to compare a third subset of data from the performance metric data between two or more individual objects within at least one of the plurality of facilities to generate a third level comparison, the user electronic device further configured to render a digital three dimensional graphical representation of the third level comparison in the virtual reality environment.

4. The system of claim 1, wherein the processing unit is further configured to add a virtual marker to at least one of the digital three dimensional graphical representation of the first level comparison or the digital three dimensional graphical representation of the second level comparison in response to a third input command received at the user electronic device.

5. The system of claim 1, wherein the user electronic device includes a head-mounted display, mobile phone, portable digital assistant, laptop computer, tablet computer, or a wireless portable device.

6. The system of claim 1, wherein the digital three dimensional graphical representation of the first level comparison and the digital three dimensional graphical representation of the second level comparison include at least one of a: number, gauge, bar graph, pie chart, color pattern, heat map, Harvey ball, arrow, emoticon, or coloration gradient.

7. The system of claim 1, wherein the user electronic device is configured to perform the dynamic transitioning by rendering an updated digital three dimensional graphical representation including updated computations of comparisons in response to user input that modifies a virtual visualization of the facility from an overhead view to a view of the two or more sections of the facility.

8. A method for generating digital three dimensional graphical representations for dynamic virtual data analysis in a virtual reality environment comprising:
retrieving performance metric data relating to a plurality of facilities from a database;
comparing a first subset of data from the performance metric data between two or more of the plurality of facilities to generate a first level comparison;
comparing a second subset of data from the performance metric data associated with two or more sections of a facility of the plurality of facilities to generate a second level comparison between the two or more sections, the two or more sections comprising at least one of a department, an aisle, a modular unit, or a shelf of the facility;
generating a digital three dimensional graphical representation for the virtual reality environment of the first level comparison that includes a virtual model of the two or more of the plurality of facilities;
generating a digital three dimensional graphical representation for the virtual reality environment of the second level comparison that is overlaid on an image of the department, the aisle, the modular unit, or the shelf of the facility, wherein the digital three dimensional graphical representation of the second level comparison displays a difference between the two or more sections;

in response to a first user input, via a user electronic device rendering a user interface, dynamically transitioning between a rendering of a digital three dimensional graphical representation of the first level comparison in the virtual reality environment and rendering of a digital three dimensional graphical representation of the second level comparison in the virtual reality environment; and updating the first level comparison or the second level comparison in response to a second user input received at the user electronic device, the second user input modifying the first subset of data or the second subset of data.

9. The method of claim 8, wherein the first subset of data and the second subset of data include data relating to at least one of: profits, shrinkage, sales, market share, expenses, customer satisfaction, associate engagement, community engagement, local economic data, facility maintenance, associate compliance, energy efficiency, or customer traffic.

10. The method of claim 8, further comprising:
comparing a third subset of data from the performance metric data between two or more individual objects within at least one of the plurality of facilities to generate a third level comparison; and
rendering, via the user electronic device, a digital three dimensional graphical representation of the third level comparison in the virtual reality environment.

11. The method of claim 8, further comprising adding a virtual marker to at least one of the digital three dimensional graphical representation of the first level comparison or the digital three dimensional graphical representation of the second level comparison in response to a third input command received at the user electronic device.

12. The method of claim 8, wherein the user electronic device includes a head-mounted display, mobile phone, portable digital assistant, laptop computer, tablet computer, or a wireless portable device.

13. The method of claim 8, wherein the digital three dimensional graphical representation of the first level comparison and the digital three dimensional graphical representation of the second level comparison include at least one of a: number, gauge, bar graph, pie chart, color pattern, heat map, Harvey ball, arrow, emoticon, or coloration gradient.

14. The method of claim 8, wherein dynamically transitioning between a rendering of a digital three dimensional graphical representation of the first level comparison and rendering of a digital three dimensional graphical representation of the second level comparison includes rendering an updated digital three dimensional graphical representation including updated computations of comparisons in response to user input that modifies a visualization of the facility from an overhead view to a view of the two or more sections of the facility.

15. A non-transitory machine-readable medium storing instructions executable by a processing device, wherein execution of the instructions causes the processing device to generate digital three dimensional graphical representations for dynamic virtual data analysis in a virtual reality environment comprising:
retrieving performance metric data relating to a plurality of facilities from a database;
comparing a first subset of data from the performance metric data between two or more of the plurality of facilities to generate a first level comparison;
comparing a second subset of data from the performance metric data associated with two or more sections of a facility of the plurality of facilities to generate a second level comparison between the two or more sections, the two or more sections comprising at least one of a department, an aisle, a modular unit, or a shelf of the facility;
generating a digital three dimensional graphical representation for the virtual reality environment of the first level comparison that includes a virtual model of the two or more of the plurality of facilities;
generating a digital three dimensional graphical representation for the virtual reality environment of the second level comparison that is overlaid on an image of the department, the aisle, the modular unit, or the shelf of the facility, wherein the digital three dimensional graphical representation of the second level comparison displays a difference between the two or more sections;
in response to a first user input, via a user electronic device rendering a user interface, dynamically transitioning between a rendering of a digital three dimensional graphical representation of the first level comparison in the virtual reality environment and rendering of a digital three dimensional graphical representation of the second level comparison in the virtual reality environment; and
updating the first level comparison or the second level comparison in response to a second user input received at the user electronic device, the second user input modifying the first subset of data or the second subset of data.

16. The non-transitory machine-readable medium of claim 15, wherein the first subset of data and the second subset of data include data relating to at least one of: profits, shrinkage, sales, market share, expenses, customer satisfaction, associate engagement, community engagement, local economic data, facility maintenance, associate compliance, energy efficiency, or customer traffic.

17. The non-transitory machine-readable medium of claim 15, wherein execution of the instructions further causes the processing device to:
compare a third subset of data from the performance metric data between two or more individual objects within at least one of the plurality of facilities to generate a third level comparison; and
render, via the user electronic device, a digital three dimensional graphical representation of the third level comparison in the virtual reality environment.

18. The non-transitory machine-readable medium of claim 15, wherein execution of the instructions further causes the processing device to add a virtual marker to at least one of the digital three dimensional graphical representation of the first level comparison or the digital three dimensional graphical representation of the second level comparison in response to a third input command received at the user electronic device.

19. The non-transitory machine-readable medium of claim 15, wherein the user electronic device includes a head-mounted display, mobile phone, portable digital assistant, laptop computer, tablet computer, or a wireless portable device.

20. The non-transitory machine-readable medium of claim 15, wherein the digital three dimensional graphical representation of the first level comparison and the digital three dimensional graphical representation of the second level comparison include at least one of a: number, gauge, bar graph, pie chart, color pattern, heat map, Harvey ball, arrow, emoticon, or coloration gradient.

21. The non-transitory machine-readable medium of claim 15, wherein dynamically transitioning between a rendering of a digital three dimensional graphical representation of the first level comparison and rendering of a digital three dimensional graphical representation of the second level comparison includes rendering an updated digital three dimensional graphical representation including updated computations of comparisons in response to user input that modifies a visualization of the facility from an overhead view to a view of the two or more sections of the facility.

\* \* \* \* \*